(12) United States Patent
Patel et al.

(10) Patent No.: US 11,055,795 B1
(45) Date of Patent: Jul. 6, 2021

(54) METHODS, SYSTEMS, AND COMPUTER PROGRAM PRODUCTS FOR LINKING DATA SCHEMAS TO ELECTRONIC TAX RETURN

(71) Applicant: Intuit Inc., Mountain View, CA (US)

(72) Inventors: Rajkumar Patel, Allen, TX (US); Eric Dunn, Frisco, TX (US); Maurice Clark, Frisco, TX (US); Nikolay Kolev, Dallas, TX (US); Uma Youts, Sunnyvale, TX (US); Gregg Gamble, Frisco, TX (US); Laura Grether, Oak Point, TX (US); Martha Ryan, Plano, TX (US); Jennifer Reeves, Frisco, TX (US); Eldwin Pile, McKinney, TX (US)

(73) Assignee: Intuit Inc., Mountain View, CA (US)

( * ) Notice: Subject to any disclaimer, the term of this patent is extended or adjusted under 35 U.S.C. 154(b) by 14 days.

(21) Appl. No.: 16/400,676

(22) Filed: May 1, 2019

Related U.S. Application Data (63) Continuation of application No. 15/011,358, filed on Jan. 29, 2016, now Pat. No. 10,319,043.

(51) Int. Cl.
*G06Q 40/00* (2012.01)
(52) U.S. Cl.
CPC .................... *G06Q 40/123* (2013.12)
(58) Field of Classification Search
USPC .................................................. 705/31, 35
See application file for complete search history.

(56) References Cited

U.S. PATENT DOCUMENTS

| | | | |
|---|---|---|---|
| 5,778,240 A * | 7/1998 | Buchman | G06F 40/18 715/205 |
| 7,168,035 B1 * | 1/2007 | Bell | G06F 40/174 715/234 |
| 7,353,248 B1 | 4/2008 | Kirkpatrick | |
| 7,383,440 B1 | 6/2008 | Miller, III | |
| 7,533,335 B1 | 5/2009 | Sawicki | |
| 7,650,566 B1 | 1/2010 | Jones | |
| 7,657,832 B1 * | 2/2010 | Lin | G06F 40/14 715/234 |

(Continued)

OTHER PUBLICATIONS

XML Document Correction Based on Update Conflict Detection Kanghong (Year: 2010).*

*Primary Examiner* — William E Rankins
(74) *Attorney, Agent, or Firm* — DLA Piper LLP (US)

(57) ABSTRACT

A method and computer program product for identifying errors in a computerized preparation of an electronic financial document to be submitted to an agency. A financial document preparation program is executed, a first connection is initiated with a computer of the agency, the schema requirements are received from the agency via the first connection, data entry fields are generated, data entered into the data entry fields is received, error rules are generated from the schema requirements, each error rule associated with a respective one of the data entry fields associated with the electronic financial document, the data entered into the data entry fields is checked against the respective error rules to identify schema errors in the data entered into the data entry fields, the electronic financial document is generated based on the data entered into the data entry fields, and the electronic financial document is electronically transmitted to the agency.

18 Claims, 6 Drawing Sheets

(56) References Cited

U.S. PATENT DOCUMENTS

| | | |
|---|---|---|
| 7,742,958 B1 | 6/2010 | Leek |
| 8,682,756 B1 | 3/2014 | Tifford |
| 9,117,247 B2 | 8/2015 | Lieberman |
| 9,892,106 B1 | 2/2018 | Lesner |
| 9,916,626 B2 | 3/2018 | Huang |
| 9,990,678 B1 | 6/2018 | Cabrera |
| 2002/0087344 A1 | 7/2002 | Billings |
| 2003/0126555 A1 | 7/2003 | Aggarwal |
| 2003/0212740 A1 | 11/2003 | Berrigan |
| 2004/0172347 A1* | 9/2004 | Barthel ............... G06N 5/04 705/31 |
| 2004/0172592 A1 | 9/2004 | Collie |
| 2004/0189716 A1* | 9/2004 | Paoli ............... G06F 40/174 715/853 |
| 2005/0038816 A1 | 2/2005 | Easton |
| 2005/0149847 A1 | 7/2005 | Chandler |
| 2005/0278353 A1* | 12/2005 | Norgaard ............ G06F 16/832 |
| 2008/0005138 A1 | 1/2008 | Gauthier |
| 2008/0080464 A1 | 4/2008 | Speight |
| 2008/0168081 A1 | 7/2008 | Gaurav |
| 2008/0288547 A1 | 11/2008 | Brodsky |
| 2009/0254812 A1 | 10/2009 | Vion-Dury |
| 2009/0281977 A1 | 11/2009 | Allen |
| 2009/0327108 A1 | 12/2009 | Swierz, III |
| 2012/0323774 A1 | 12/2012 | Gardner |
| 2014/0026041 A1* | 1/2014 | Bhargav ............ G06F 40/18 715/255 |
| 2014/0123228 A1* | 5/2014 | Brill ............... H04L 63/1416 726/4 |
| 2014/0297490 A1 | 10/2014 | Harnisch |
| 2015/0324437 A1 | 11/2015 | Jiang |
| 2016/0078567 A1 | 3/2016 | Goldman |
| 2017/0186099 A1 | 6/2017 | Lubczynski |

\* cited by examiner

FIG. 1

|                              205      215a     215c         215b      220a
|                              First Name [        ]  Middle Initial [  ]
|                              Last Name  [        ]  Jr., Sr., etc. [  ]
|                                                                    215d
|                              Social Security Number [    ] 215e
|                              Birth Date (mm/dd/yyyy) [   ] 215f
|                              Occupation [        ] 215g
|                              Best Contact Phone [     ] 215h  Extension [  ] 215i
|                              State of Residence on December 31, 2009  Explain This
|                              State [           ] 215j

Do Any of These Apply?

☐ A parent or someone else can claim this person as a dependent on their return.

☐ This person served in the U.S. Armed Forces in 2009 (active, reserve, or National Guard). The state selected above must be the Home of Record for this person.

☐ This person was legally blind as of December 31, 2009. Explain This

☐ This person passed away before filing this return.

☐ None of the above (?) Learn more about this topic

[Back]                                                        [Continue]

FIG. 2a

Enter Your W-2

If you have a 1099, we'll work on that later.

I have more than one W-2 form W-2 Wage and Tax Statement

Employer Information

Box b Employer's Federal ID Number
EIN Explain This [ ]

Box c Employer's Name and Address
Location  ⦿ U.S. Address   ○ Foreign Address
Employer's Name [ ]
Name, cont'd [ ]
Address [ ]
City [ ]
State [ ▾ ]
ZIP Code [ ]

METHODS, SYSTEMS, AND COMPUTER PROGRAM PRODUCTS FOR LINKING DATA SCHEMAS TO ELECTRONIC TAX RETURN

CROSS-REFERENCE TO RELATED APPLICATIONS

This application is a Continuation of U.S. patent application Ser. No. 15/011,358 filed Jan. 29, 2016. The contents of which is incorporated herein by reference in its entirety.

BACKGROUND

The invention relates to preparation of electronic financial documents, such as electronic tax returns. Tax preparation programs have become very popular and allow a user, such as an individual, taxpayer, accountant, or tax professional, to prepare and electronically file a tax return using a computer. Known tax preparation programs present a list of tax-related questions or data entry fields to the user as a series of interview screens or fillable forms, in response to which the user enters the appropriate data or answers. For example, in an individual tax return, certain interview screens or questions may involve personal and family matters such as name, address, social security number, marital status, number of dependents, etc. Other interview screens and questions may involve financial matters such as wages, retirement plan contributions, and social security, state and federal taxes paid or withheld as provided in Form-W2, charitable contributions, mortgage interest paid, property tax paid, etc. The electronic tax return may also be a business or corporate return with business related income and expense items. After entry of the data, the tax preparation application prepares an electronic tax return, which is formatted as necessary and electronically filed with a tax authority, such as the Internal Revenue Service (IRS), state tax authority, or other tax collecting entity.

While tax preparation programs have been used effectively in the past to prepare and file tax returns, their effectiveness relies in part upon data input into the electronic tax return. The data, whether entered manually or imported from another program or file, may be as accurate as its source and may be inaccurate for various reasons. For example, it is not uncommon for manually entered data to be wrong for various reasons including human error, defective keyboards and issues with programs and files. Human error may involve typographical errors such as pressing the wrong number, pressing a number one too many or one to few times, pressing two keys inadvertently, inserting a comma in the wrong place, inserting a decimal point in the wrong place, or simply entering correctly typed data in the wrong field. Similar errors may be caused by computer components, such as a defective keyboard that has an inoperable or sticky key and programs or files that do not operate as intended or that have corrupted data. Similar issues may arise with data that is imported from another program or file. There may also be cases in which a tax preparation program generates errors while importing data from another program or file.

These errors are often caught by a diagnostic routine that is run at the end of the data input process. For example, known tax preparation programs, such as TurboTax® (available from Intuit Inc.) and other tax preparation programs conduct a final review to check for errors in a completed tax return and to assess the risk of an audit by a tax authority. For example, a tax preparation program, such as Turbo-Tax®, may perform a final review to check for formalities, such as empty fields that should be populated with data or boxes that need to be checked to ensure that no available deductions or credits were missed (e.g., if the preparer did not review certain interview screens or fill out certain sections of the tax return).

However, resorting to diagnostics to catch errors at the end of the data input process increases inefficiencies in client workflow, and increases rework or review time for tax preparers. Furthermore, errors that are not caught by the diagnostics may cause an electronically filed tax return to be rejected by one or more tax authorities. In particular, each tax authority defines data schema that impose data constraints on the output of the tax preparation program, so that the output data can be accepted and automatically processed by the respective tax authority. Data schema imposes constraints on the completeness, integrity, and format (or architectural structure) of the output data. For example, an answer to a question entered into a particular data field must be binary (Y/N), or the data entered into a social security data field must contain only nine numbers in the range of 111-11-1111 to 99-99-9999. Any data varying from the data defined by the schema will cause an error.

One example of schema developed by the Internal Revenue Service is based on Modernized e-file (MeF) system. MeF uses extensible markup language (XML) format that is used when identifying, storing, and transmitting data. For example, each line or data element on a tax form is given an XML name tag as well as every instance of supporting data. Tax form preparation software uses XML schemas and business rules to electronically prepare and transmit tax forms to the appropriate tax agencies. The IRS validates the transmitted files against the XML schemas in the MeF schema.

In a typical embodiment, this data schema will be incorporated into the diagnostics of the tax preparation program, such that errors in the data input into data entry fields that do not comply with the schema are flagged for correction prior to transmittal of the output data to the tax authority. However, tax authorities periodically update their data schema, which either require programmers to tediously incorporate the updated data schema into the tax preparation program or will cause schema errors in the output data, resulting in the rejection of the tax return. This issue is compounded by the fact that a tax preparation program needs to accommodate the schema for multiple tax authorities. For example, in the United States, a tax preparation program should accommodate a federal tax authority and fifty state tax authorities.

There, thus, remains a need to provide a means for catching errors when data is entered into the data fields of a tax preparation program without having to modify the tax preparation program in response to periodic tax authority schema updates.

SUMMARY

In accordance with the present inventions, and method and computer program product for identifying errors in a computerized preparation of an electronic financial document (e.g., an electronic tax return) to be submitted to an agency (e.g., a governmental agency, such as a tax agency (e.g., the Internal Revenue Service (IRS))) that promulgates schema requirements for the electronic financial document is provided.

The present inventions solve the computer-centric problem found in conventional financial document preparation programs that only utilize the schema requirements accessible by the financial document preparation programs, and are thus, not presently capable of taking into account periodic schema updates promulgated by the relevant agency. The present inventions solve this problem by initiating a connection with the relevant agency upon the launching of a financial document preparation program to acquire the most current schema updates. Certain embodiments also solve the computer-centric problem found in conventional program updating techniques that require updated schema requirements to be coded into the financial document preparation program. These embodiments solve this problem by associating data entry fields with updated schema requirements via tags that allow the data entered into the data entry fields to be conveniently checked against the most current schema requirements obtained from the relevant tax agency, thereby obviating the need to recode the financial document preparation program. Thus, the present inventions provide a real world tangible result of ensuring that the financial document preparation program acquires the most up-to-date schema requirements promulgated by a relevant tax agency without requiring that the financial document preparation be re-coded to accommodate the schema requirements and minimizing the chance that the financial document will be rejected when electronically filed with the agency. Some embodiments of the present inventions utilize user interfaces that allow the preparer of the financial document to be alerted of schema errors in real-time as data is entered into the data entry fields associated with the financial document in real-time as the data, thereby providing a more efficient and less tedious workflow for the preparer to complete the financial document, reducing rework or review time for the preparer, and reducing or eliminating the need for diagnostics. Thus, the present inventions are not merely directed to a method of preparing a financial document, but rather a method and computer program product capable of making a connection to an agency to receive the most up-to-date schema requirements that are recalled using tags associated with the data entry fields of the financial document.

In accordance with a first aspect of the present inventions, the method comprises executing a financial document preparation program (e.g., a tax preparation program), and initiating a first connection with a computer of the agency in response to the execution of the financial document preparation program. In one embodiment, the financial document preparation is locally executed on a user computer. In another embodiment, the financial document preparation program is remotely executed on an intermediary computer of a host, in which case, the method further comprises creating a second connection between the intermediary computer and a user computer, such that the executed financial document preparation program may be remotely accessed on-line by the user computer over the second connection.

The method further comprises receiving the schema requirements from the agency via the first connection. In one embodiment, the first connection is between the computer of the agency and an intermediary computer of a host, in which case, the method may further comprise creating a second connection between the intermediary computer and a user computer, such that the schema requirements are received from the agency via the first and second connections. The method further comprises generating a plurality of data entry fields, and generating a plurality of error rules from the schema requirements, with each error rule associated with a respective one of the plurality of data entry fields associated with the electronic financial document.

The method further comprises receiving data (e.g., tax data) entered into the plurality of data entry fields. For example, the data may be manually entered into the data entry fields by a preparer of the electronic financial document, electronically scanned into the data entry fields, and/or imported from a database into the data entry fields. The method may further comprise performing at least one numerical calculation based on the data entered into the data entry fields. The method further comprises generating the electronic financial document based on the data entered into the data entry fields, and electronically transmitting the electronic financial document to the agency.

The method further comprises checking the data entered into the data entry fields against the respective error rules to identify one or more schema errors in the data entered into the data entry fields. In one embodiment, the method further comprises associating a plurality of tags with the respective plurality of data entry fields, so that each of the tags is linked to a respective one of the error rules. In this case, the method further comprises, for each data entry field, reading the error rule linked to the tag of the respective each data entry field, and checking the data entered into the respective data entry field against the linked error rule to identify a schema error in the data entered into the respective data entry field. The schema error(s) may be, e.g., identified as the data is entered into the data entry fields and/or compiled in an error report (e.g., a log file, an email, web page configured for display on a web browser, or an electronic document).

The method may optionally comprise alerting a preparer of the electronic financial document of the schema error(s). The alert may, e.g., comprise a message displayed on a screen of a user computer utilized to prepare the electronic financial document and/or comprise highlighting or identifying the data entry field in which data having a schema error was entered. The preparer may be alerted before the electronic financial document is completed, e.g., in real time during preparation of the electronic financial document in response to input of data having a schema error into one of the data entry fields.

In one embodiment, one or more of the error rules is associated with one or more respective error explanations, and the method further comprises generating a narrative explanation utilizing the error explanation(s) associated with the identified schema error(s). The narrative explanation may be automatically generated. In another embodiment, the error explanation(s) comprise templates having fillable fields, and the narrative explanation is generated using the templates and filling in the fillable fields using the data entered into the data entry fields. The error explanation(s) may comprise fragments, expressions, and partial statements, in which case, the method may further comprise converting the error explanation(s) into natural language expressions. The method may further comprise generating additional, more detailed narrative explanations in response to user prompts.

In accordance with a second aspect of the present inventions, the computer program product comprises a financial document preparation program (e.g., a tax preparation program) configured for being executed, initiating a first connection with a computer of the agency in response to the execution of the financial document preparation program, generating a plurality of data entry fields, and receiving data entered into the plurality of data entry fields. For example, the data may be manually entered into the data entry fields by a preparer of the electronic financial document, electronically scanned into the data entry fields, and/or imported from a database into the data entry fields. The financial document preparation program may further be configured for performing at least one numerical calculation based on the data entered into the data entry fields. The financial document preparation program is further configured for generating the electronic financial document based on the data entered into the data entry fields, and causing the electronic financial document to be electronically transmitted to the agency.

The computer program product further comprises a schema error module configured for receiving the schema requirements from the agency via the first connection, and generating a plurality of error rules from the schema requirements. Each error rule is associated with a respective one of the plurality of data entry fields associated with the electronic financial document. In one embodiment, the first connection is between the computer of the agency and an intermediary computer of a host, the financial document preparation program is configured for creating a second connection between the intermediary computer and a user computer, and the schema error module is configured for receiving the schema requirements from the agency via the first and second connections.

The computer program product further comprises an error check engine configured for checking the data entered into the data entry fields against the respective error rules to identify one or more schema errors in the data entered into the data entry fields. In one embodiment, the financial document preparation program is further configured for associating a plurality of tags with the respective plurality of data entry fields, so that each of the tags is linked to a respective one of the error rules. In this case, the error check engine is configured, for each data entry field, reading the error rule linked to the tag of the respective each data entry field, and checking the data entered into the respective data entry field against the linked error rule to identify a schema error in the data entered into the respective data entry field. The schema error(s) may be, e.g., identified as the data is entered into the data entry fields and/or compiled in an error report (e.g., a log file, an email, web page configured for display on a web browser, or an electronic document).

The error check engine is optionally configured for alerting a preparer of the electronic financial document of the schema error(s). The alert may, e.g., comprise a message displayed on a screen of a user computer utilized to prepare the electronic financial document and/or comprise highlighting or identifying the data entry field in which data having a schema error was entered. The preparer may be alerted before the electronic financial document is completed, e.g., in real time during preparation of the electronic financial document in response to input of data having a schema error into one of the data entry fields.

In one embodiment, one or more of the error rules is associated with one or more respective error explanations, in which case, the computer program product may comprise an error explanation engine configured for generating a narrative explanation utilizing the error explanation(s) associated with the identified schema error(s). The narrative explanation may be automatically generated. In another embodiment, the error explanation(s) comprise templates having fillable fields, and the narrative explanation is generated using the templates and filling in the fillable fields using the data entered into the data entry fields. The error explanation(s) may comprise fragments, expressions, and partial statements, in which case, the error explanation engine may be further configured for converting the error explanation(s) into natural language expressions. The error explanation engine may be further configured for generating additional, more detailed narrative explanations in response to user prompts.

Other and further aspects and features of the disclosed embodiments will be evident from reading the following detailed description of the embodiments, which are intended to illustrate, not limit, the invention.

BRIEF DESCRIPTION OF THE DRAWINGS

The drawings illustrate the design and utility of various embodiments of the present invention, in which similar elements are referred to by common reference numerals. In order to better appreciate how the above-disclosed and other advantages and objects of the various embodiments are obtained; a more particular explanation is provided below with reference to specific embodiments thereof, which are illustrated in the accompanying drawings. However, these drawings depict only some embodiments of the invention, and are not therefore to be considered limiting of its scope. A brief description of the drawings is provided below.

DETAILED DESCRIPTION OF ILLUSTRATED EMBODIMENTS

Embodiments relate to notifying a preparer of an electronic financial document, such as an electronic tax return, of schema errors. A preparer may be notified of schema errors at various times during preparation of an electronic tax return including in real time, e.g., after entry of data. An alert is issued to the preparer to notify the preparer of the schema errors and, according to embodiments, is specific in that the alert identifies a particular field or particular data, e.g., by form and number or with another specific identification. For this purpose, embodiments directly receive up-to-date schema requirements directly from a tax agency (e.g., the Internal Revenue Service (IRS)) to ensure that the data entered into the data entry fields of the electronic tax return conform to the up-to-date schema requirements. Although embodiments described herein relate to electronic tax returns having schema requirements promulgated by a tax agency, such as the IRS, it should be appreciated that the present inventions may be applied to any electronic financial document having schema requirements promulgated by any agency.

Figure 1:
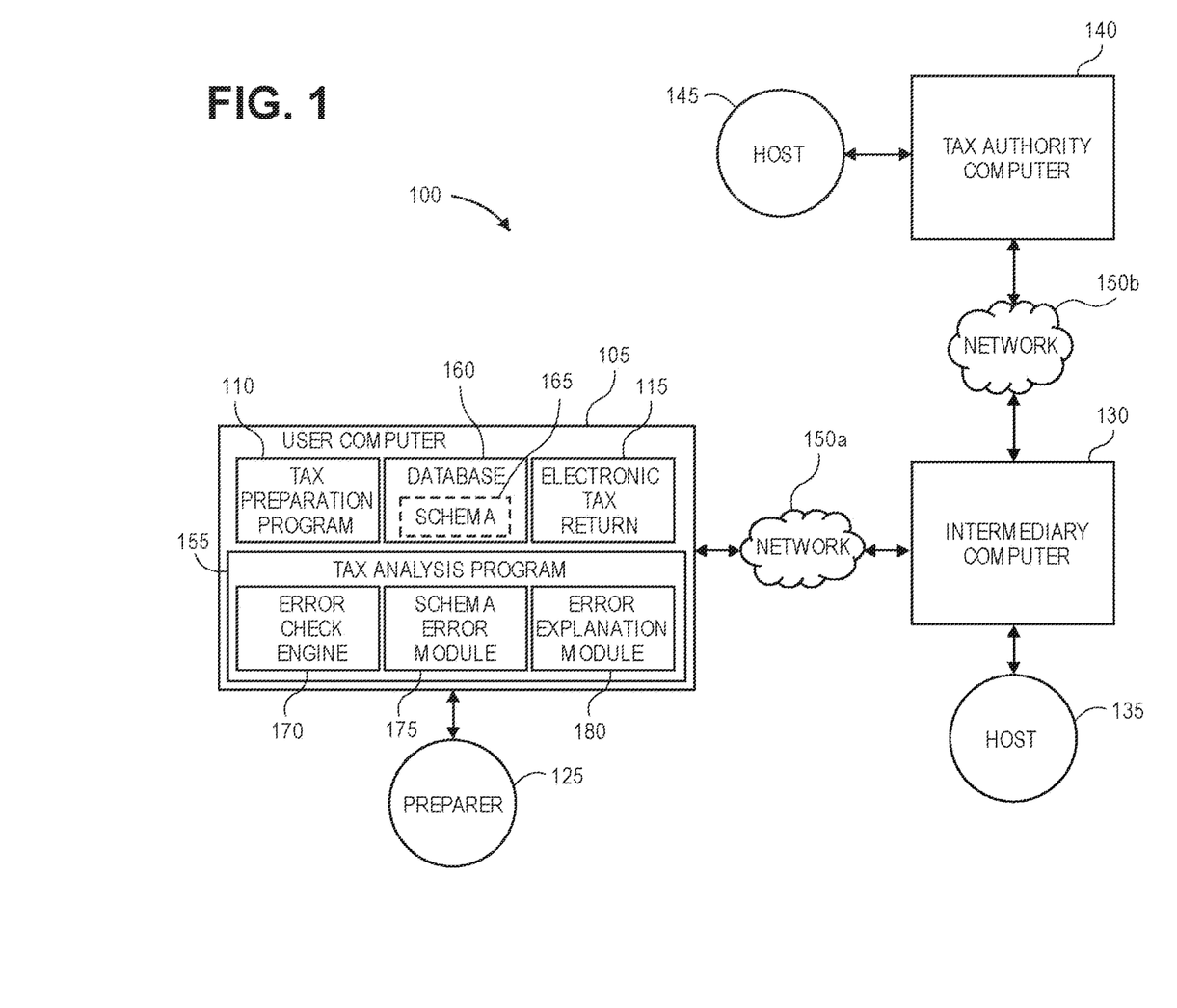
FIG. 1 illustrates an electronic tax return preparation system constructed according to one embodiment of the present inventions for preparing and filing an electronic tax return with a tax authority.

Referring to FIG. 1, an electronic tax return preparation system 100 constructed according to one embodiment for identifying schema errors in an electronic tax return will now be described. The system 100 includes a first computing apparatus or user computer 105 on which a tax preparation program 110 executes to prepare an electronic tax return 115 based upon tax return data 120 received at the user computer 105 for subsequent submission to an appropriate tax agency. The tax preparation program 100 operates in a conventional manner by performing tax calculations in response to tax data entered into the tax preparation program 100 to generate the electronic tax return 115. The user computer 105 may be a home or business computer utilized by the preparer 125 who may be an individual preparing his or her own personal tax return 115 or an accountant or a tax professional preparing a personal or corporate or business entity tax return 115. For ease of explanation, reference is made to a user or preparer 125, but it should be understood that embodiments may involve individuals or consumer-level tax preparation programs 110 and corporate or business entity tax returns and professional tax preparation programs 110. Examples of tax preparation programs 110 that may utilize the embodiments described herein include desktop or online versions of TURBOTAX, PROSERIES, and LACERTE, available from Intuit Inc. and other tax preparation programs 110 including, for example, programs available from Thomson Reuters, CCH and Drake Software and H&R Block TaxCut. TURBOTAX, PROSERIES AND LACERTE are registered trademarks of Intuit Inc.

The system 100 may also include or involve an intermediary computer 130 managed by a host 135. The intermediary computer 130 is configured or operable to format and electronically file electronic tax returns 115 with a computer 140 of a tax authority 145, examples of which include a federal tax authority, e.g., the Internal Revenue Service (IRS), a state tax authority or other tax collecting entity of the United States, a state thereof, or another country or state thereof (generally, "tax authority"). Examples of hosts 135 that provide intermediary computers 130 for these purposes include, for example, Intuit Inc., which provides the intermediary computer 130 or server of the Intuit Electronic Filing Center for electronically filing tax returns 115 and other hosts 135 that provide tax preparation programs 110 and electronic filing servers.

For communication purposes, the user computer 105 is operably coupled to or in communication with the intermediary computer 130 through a network 150a, and the intermediary computer 130 is operably coupled to or in communication with the tax authority computer 140 through a network 150b. Each of the networks 150a-b and other networks discussed herein (generally, network 160) may be different, or two or more networks 150 may be the same depending on the system configuration and communication protocols employed. One or more or all of the networks 150 may be, for example, a wireless or cellular network, a Local Area Network (LAN) and/or a Wide Area Network (WAN). Reference to a network 150 generally is not intended to refer to a specific network or communications protocol, and embodiments can be implemented using various networks 150 and combinations thereof.

The user computer 105 further comprises or accesses a tax data analysis program 155 and a tax database 160. FIG. 1 illustrates the tax preparation program 110 and the tax data analysis program 155 as separate programs, but in other embodiments, the tax data analysis program 155 may be a part or module of the tax preparation program 110. Further, while FIG. 1 illustrates the tax preparation program 110, the tax data analysis program 155 and the tax database 160 as residing on the same user computer 105, one or more of these system components may be located remotely, for example, in a cloud environment or another remotely located computer that is accessible by the user computer 105 through a network (not shown). For example, as illustrated in FIG. 1, the tax preparation program 110 and/or tax data analysis program 155 may reside on and be executed on the user computer 105 or, alternatively, the tax preparation program 110 and/or tax data analysis program 155 may reside and be executed on a remote computing device, such as the intermediary computer 130. In latter case, the user computer 105 communicates with the intermediary computer 130 using an application (not shown) contained on the user computer 105. The tax preparation program 110 may also be run using conventional Internet browser software.

The user computer 105 obtains tax data from tax return data 120 for input into the tax preparation program 110 and/or the tax database 160. The tax return data 120 may be entered into the user computer 105 in one of a number of different manners. For example, the tax return data 120 may originate from the preparer 125, in which case, the tax return data 120 may be manually entered into the computer 105.

The tax return data 120 may alternatively be automatically entered into the computer 105. For example, the tax return data 120 may be embodied in a photographic image of a tax document (e.g., a prior IRS Form 1040, W-2, etc.) that can be scanned into the computer 105, and then processed by the tax preparation program 110 to extract relevant data that are then automatically transferred and stored within the tax database 160. Object Character Recognition (OCR) techniques along with pre-stored templates of tax forms may be called upon to extract relevant data from the scanned or photographic images whereupon the data is then transferred to the tax database 160.

As another example, the tax return data 120 may be electronically stored in a remote database. The electronically stored tax return data 120 can be searched, copied and transferred to the tax database 160. The tax forms may be in a proprietary format (e.g., .txf, .pdf) or an open source format. An online resource may include, for example, websites for the employer that contain tax-related information. For example, financial service providers such as banks, credit unions, brokerages, investment advisors typically provide online access for their customers to view holdings, balances, transactions. In another example, prior tax returns may be obtained by accessing a government database (e.g., IRS records). Tax-related information can also be accessed from financial accounting applications, such as QUICKBOOKS, available from Intuit Inc. of Mountain View, Calif.

In facilitating the entry of the tax return data 120, the user computer 105 may provide a visual screen or series of screens to the preparer 125. For example, the user computer 105 may present pre-programmed interview screens containing a series of questions that can be answered by the preparer 125 or requests to include dollar amounts, check or un-check boxes, select one or more options from a pull down menu, select radio buttons, or the like. Alternatively, the user computer 125 may present a form containing fillable form fields for the preparer 125. However entered, the tax data is transferred or copied to the tax database 160 and entered into to the data entry fields of the electronic tax return 115.

Figure 2A:
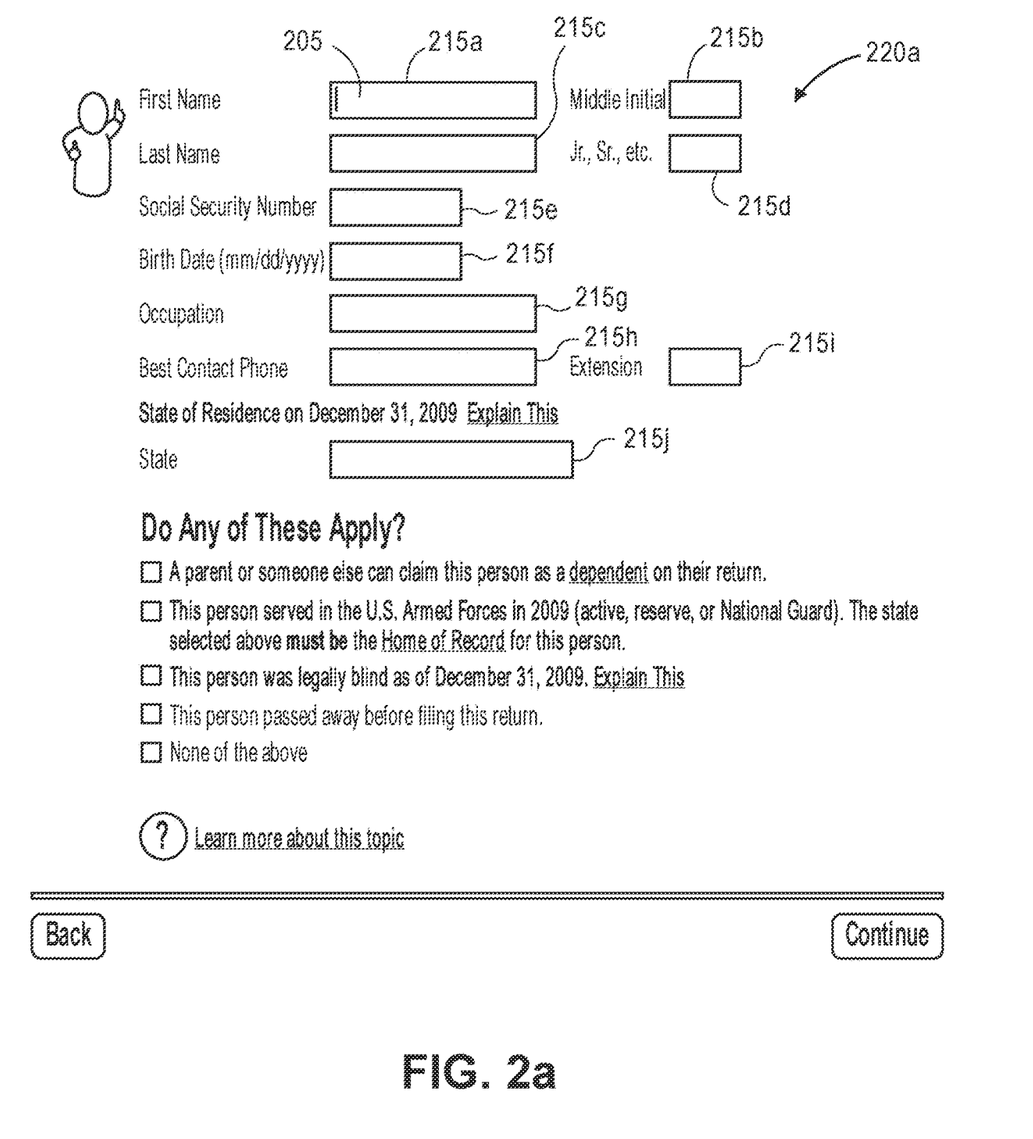
FIGS. 2a-2c illustrate examples of interview screens generated by a tax preparation program of the electronic tax return preparation system of FIG. 1.
Figure 2B:
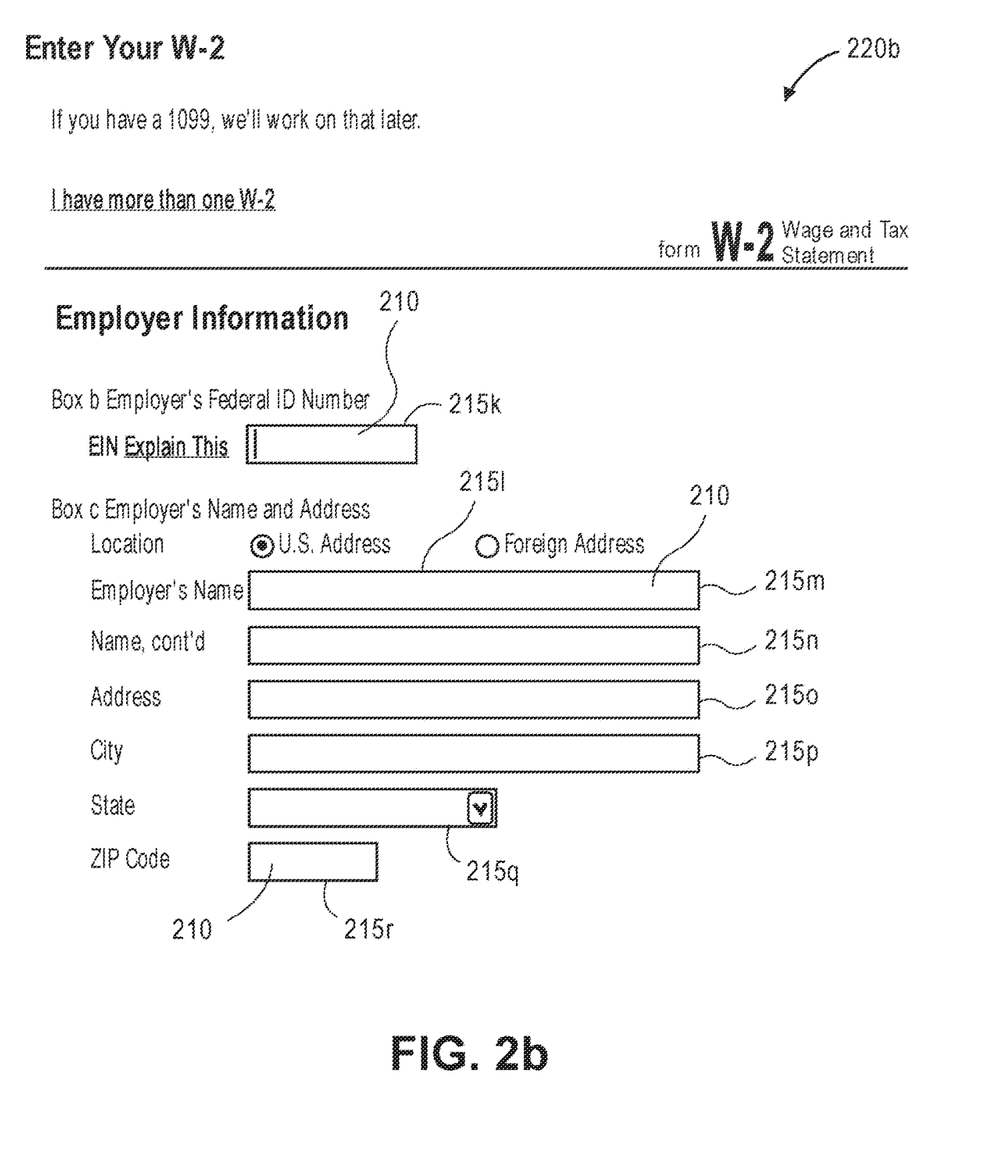
Figure 2C:
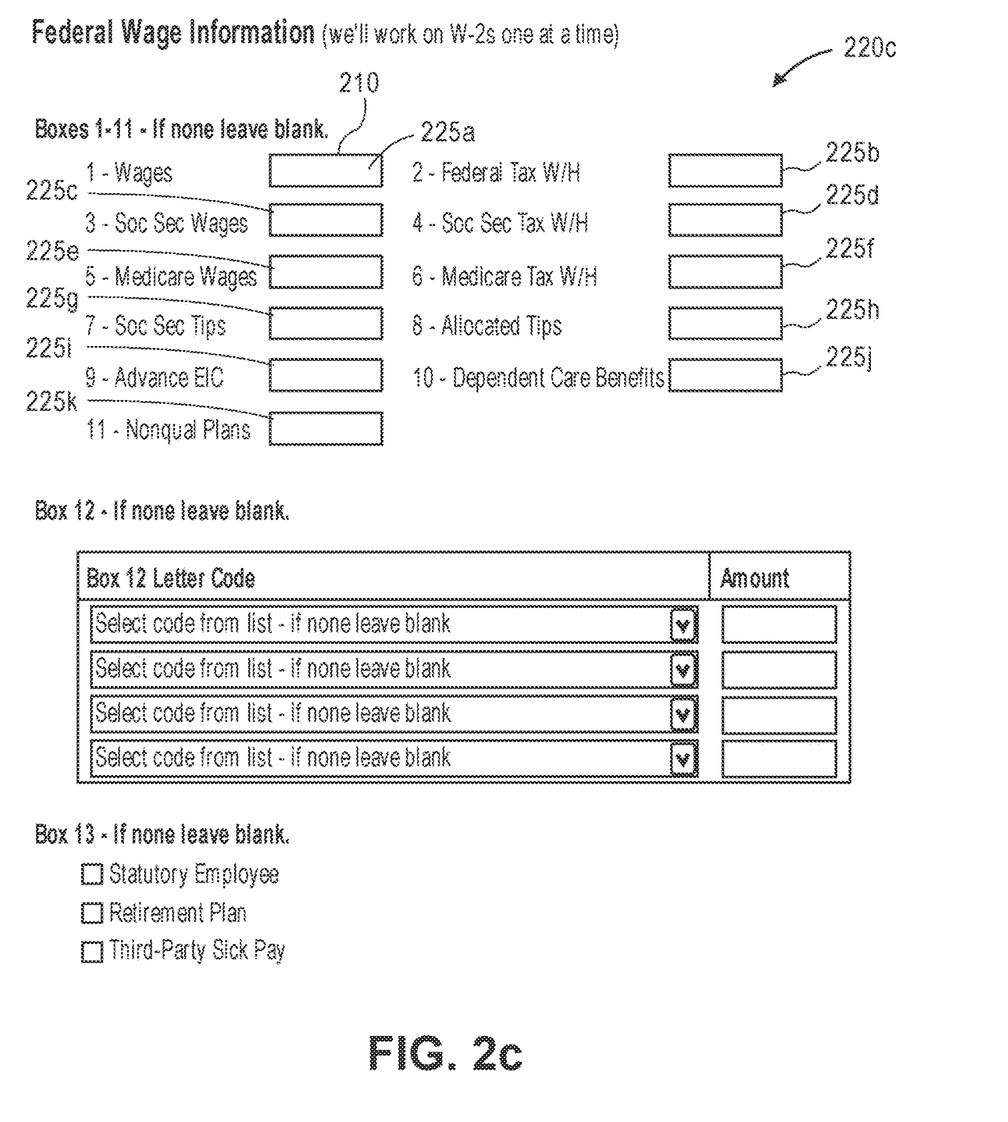

For example, with reference to FIGS. 2a-2c, general or non-quantifiable alpha, alpha-numeric and numeric data 205 (defined as non-quantifiable data) and quantifiable, numeric tax data 210 (defined as quantifiable data) may be received by the tax preparation program 110 or at the computer 105. The non-quantifiable data 205 may be various types of data not involved in a tax calculation (e.g., various data describing the tax filer and describing the employer of the tax filer). In contrast, the quantifiable, numeric data 210 may be various types of data involved in a tax calculation (e.g., wages, withholdings, tips, etc.).

One or more fields 215a-j (FIG. 2a) and 215k-r (FIG. 2b) of one or more interview screens 220a, 220b generated by the tax preparation program 110 may be populated with respective non-quantifiable data 205 to prepare at least a portion of the electronic tax return 115, whereas one or more fields 225a-k (FIG. 2c) of one or more interview screens 230 generated by the tax preparation program 110 may be populated with respective quantifiable data 210 to prepare at least another portion of the electronic tax return 115.

The interview screen examples shown in FIGS. 2a-2c are provided to generally illustrate examples of interview screens (which, in this illustrative example, are generated by TURBOTAX) and how different fields thereof are for entry of different types of data, non-quantifiable data that is not part of a tax calculation and quantifiable, and numeric data that is part of a tax calculation.

The tax database 160 contains therein schema requirements 165 or a canonical model representative to the tax data entry fields (typically, fields for the input data values for preparing the electronic tax return 115) and the calculated data entry fields (the fields for the data calculated using the tax data) utilized or otherwise required to complete the electronic tax return 115. The schema requirements 165 may include, for example, a schema based on the Modernized e-File (MeF) system developed by the Internal Revenue Service. MeF uses extensible markup language (XML) format that is used when identifying, storing, and transmitting data. For example, the tax preparation program 105 may use the XML schemas 165 to electronically prepare and transmit electronic tax returns to the appropriate tax agencies via a MeF web-based system that allows electronic filing of tax returns via the Internet. Of course, other e-filing systems may also be used other than those that rely on the MeF standard. The tax agencies validate the transmitted electronic tax returns against the XML schemas 165. With respect to e-filed payroll tax forms, the payroll tax form may be filed using the MeF web-based system that allows electronic filing of tax returns via the Internet.

Significantly, in response to executing the tax preparation program 110, the system 100 initiates a connection with computer 140 of the tax authority 145, and schema requirements 165 are then transferred from the tax authority computer 140 to the tax database 160, so that the tax preparation program 100 is always supplied with the most current schema updates generated by the tax authority 145. In the illustrated embodiment, the schema requirements 165 are transferred from the tax authority 145 to the tax database 160 via the intermediary computer 130 managed by the host 135, although the schema requirements 165 may be transferred from the tax authority 145 to the tax database 160 directly without intervention by the intermediary computer 130.

For example, if the tax database 160 is located in the user computer 105 as illustrated, a first connection can be created between the intermediary computer 130 and the tax authority computer 140 over the network 150a, so that the schema requirements 165 can be transferred from the computer 140 to the intermediary computer 130, and a second connection can be created between the intermediary computer 130 and the user computer 105 over the network 150b, so that the schema requirements 165 can then be transferred from the intermediary computer 130 to the user computer 105. Of course, if the schema requirements 165 are directly transferred from the computer 140 to the user computer 105 with no intervention by the intermediary computer 130, a connection between the computer 140 and the user computer 105 will be sufficient to transfer the schema requirements 165 to the tax database 160. Alternatively, if the tax database 160 is located in the intermediary computer 130, the connection created between the intermediary computer 130 and the tax authority computer 140 will be sufficient to transfer the schema requirements 165 to the tax database 160.

The tax analysis program 155 comprises an error check engine 170, a schema error module 175, and an optional error explanation engine 180 for identifying and explaining schema errors to the preparer 125 in the preparation of the electronic tax return 115. The schema error module 175 generates error rules from the respective schema requirements 165 and stores these error rules in the tax database 160, with each error rule being associated with a particular tax data field of the electronic tax return 115. In the illustrated embodiment, a tag is associated with each of the tax data fields of the electronic tax return 115, such that the tag is linked to the respective error rule. Each error rule comprises meta data that is configured to be usable by the error check engine 170 to check a data value for a respective data field and determine whether it conforms to the schema requirements 165 for the particular electronic tax return 115 being prepared as promulgated by the tax agency. For instance, the error rules may include meta data configured to check for errors in the formatting of the tax data in respective tax data fields. As several examples, an error rule may check that the value for the EIN is only numbers and 9 digits; an error rule may check that the wages, tips and other compensation is only a positive number, an error rule may check that the ZIP code includes only 5 numbers or 9 numbers, an error rule may check that the state includes a valid two letter state code, etc.

The error check engine 170 is configured to read/access the tax data from the tax database 160 and check such data against the error rules for the respective data fields to identify one or more errors in the preparation of the electronic tax return 115. In particular, for each data field of the electronic tax return 115, the error check engine 170 reads from the tax database 160 the error rule linked to the tag of the respective data field of the electronic tax return 115, and checks the data entered into the respective data field against the linked error rule to identify a schema error in the data entered into the respective data field. If the error check engine 170 determines that a data value does not conform to the requirements of the error rule, then the error check engine 170 flags the error and creates an error record that identifies the error.

The error check engine 170 may alert the preparer 125 of errors before the electronic tax return 115 is completed. For example, the error check engine 170 may generate a pop-up message or highlight or otherwise identify the data entry field in which data having a schema error was entered. The error check engine 170 may identify and alert the preparer 125 of errors in real-time, and in particular, on a field level or entry level as the data is being accessed and/or input into the tax preparation program 110. Thus, it does not have to be executed on the entire electronic tax return 115. Moreover, the error check engine 170 can check for errors using the error rules in the schema error module 175 as the data is being input, such as being typed in by the preparer 125. In such case, the error check engine 170 can be configured to block entry of invalid data and/or alerting the preparer 125 when the preparer 125 attempts to enter data that does not conform to the applicable error rule.

In order to provide a more human understandable explanation of errors according to the error rules, each of the error rules may also have a schema error explanation associated with the error rule. The schema error explanation may include a narrative explanation, fragments, expressions, and/or partial statements. In this case, the error check engine 170 may alert the preparer 125 by displaying an error message associated with the applicable error rule. The errors identified by the error check engine 170 and the corresponding explanations may also be compiled into a report for use by the preparer 125. The report may be as simple as a log file, or it may be an email, or an electronic document like a pdf or Microsoft Word file. The report could also be a web page configured for display on a web browser and made accessible via the internet. The error explanation engine 170 may also transmit the errors for display to the preparer 125, and/or utilize the errors in the process of data entry via the preparer 125.

A schema error explanation associated with an error rule for checking the format of an EIN may be a complete sentence such as "The EIN must include only numbers and 9 digits." The schema error explanation may be a template having fillable fields and the error check engine 170 may be configured to provide the explanation as well as providing a description of the specific erroneous input, such as "The EIN must include only numbers and 9 digits, and the value provided is ________" wherein the error check engine 170 is configured to fill in the blanks with actual value input to the tax preparation program 110. The error explanation may also include a recommendation or requirement for correcting the error. In the EIN example, the recommendation may state something like, "You must enter 9 numbers, and no other characters."

Optionally, instead of the error rules having schema error explanations, the error explanation engine 180 may receive errors identified by the error check engine 170 and then generate error explanations. In this case, the error explanation engine 180 may be configured to utilize the schema error explanation to generate a narrative explanation of errors identified according to a particular error rule.

The error explanation engine 180 may be configured to generate natural language expressions that are more easily understood by a user. The error explanation engine 180 may also be configured to generate additional, more detailed narrative explanations in response to user prompts. For instance, each of the error rules may be associated with a respective error explanation, or plurality of error explanations such that a single error rule has multiple error explanations, such as a general explanation and additional more detailed explanations. The error explanation engine 180 may display the general explanation along with user prompts (e.g., selection buttons, hyperlinks, etc. may be used to allow the preparer 125 to select them) that the preparer 125 can select in order to view additional more detailed explanations. This allows the preparer 125 to drill down on an error to view more detailed explanations. In another optional feature, errors may be identified and explanations generated in accordance with error graphs in the manner described in U.S. patent application Ser. No. 14/981,642, entitled "Systems and Methods for Identifying and Explaining Schema Errors in the Computerized Preparation of a Payroll Tax Form," which is expressly incorporated herein by reference.

Figure 3:
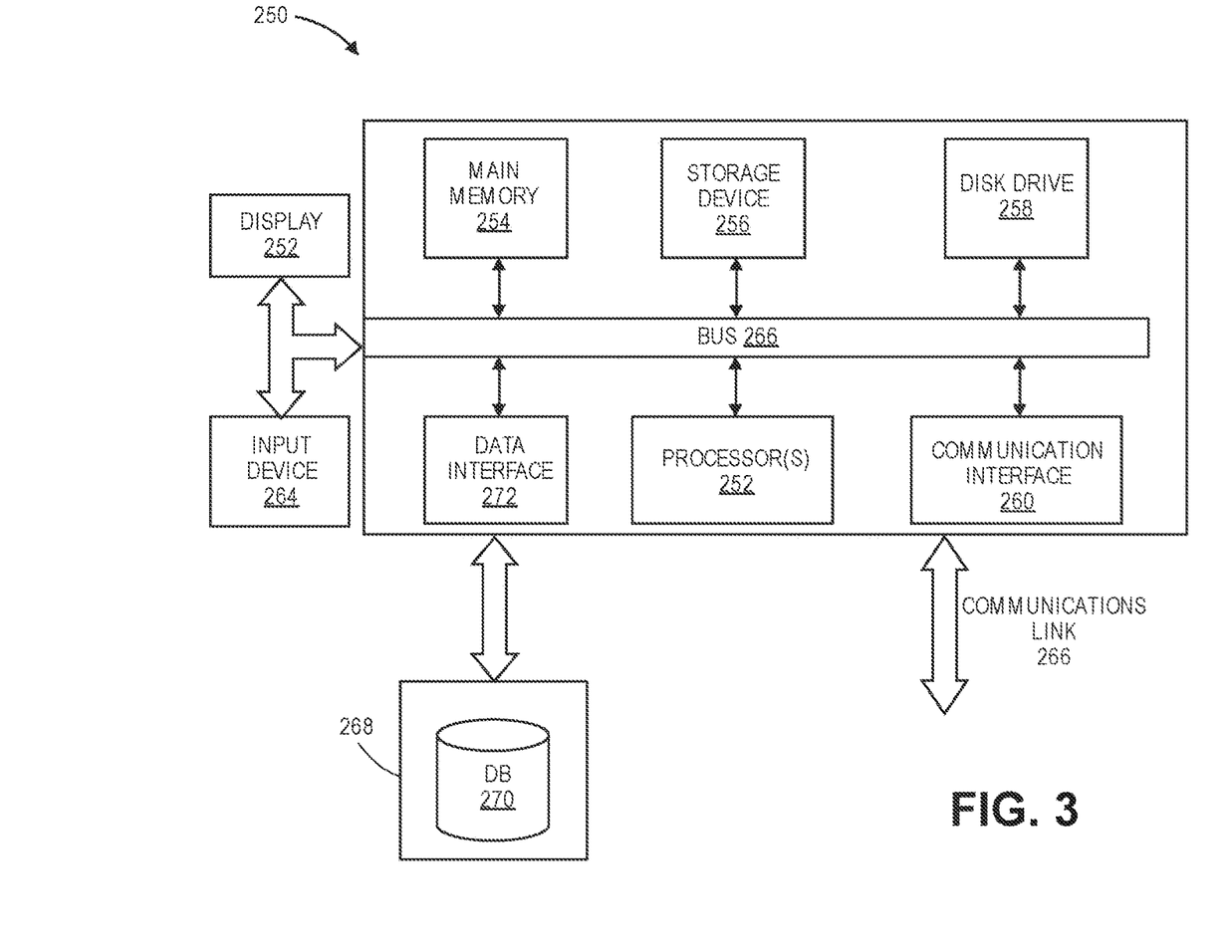
FIG. 3 is a computer system that can be implemented by the system of FIG. 1.

Referring now to FIG. 3, a block diagram of components of an illustrative computing system 250 suitable for implementing an embodiment of the user computer 105, intermediary computer 130, and computer 140. The computing system 250 includes one or more processors 252, system memory 254 (e.g., RAM), static storage device 256, disk drive 258 (e.g., magnetic or optical), wireless communication interface 260 (e.g., modem or Ethernet card), display 262 (e.g., LRT or LCD), input device 264 (e.g., keyboard and cursor control device), and a bus 266 or other communication mechanism for interconnecting these components. The processor(s) 252 may execute one or more sequences of one or more instructions contained in system memory 254. Such instructions may be read into system memory 254 from another computer readable/usable storage medium, such as static storage device 256 or disk drive 258.

The computer system 250 may transmit and receive messages, data, and instructions, including program, i.e., application code, through communication link 266 and communication interface 260. Received program code may be executed by processor 252 as it is received, and/or stored in disk drive 258, or other non-volatile storage for later execution. The computer system 250 may in conjunction with a data storage system 268, e.g., a data storage system 268 that contains a database 270 that is readily accessible by the computer system 250. The computer system 250 communicates with the data storage system 268 through a data interface 272. The data interface 272, which is coupled to the bus 266, transmits and receives electrical, electromagnetic or optical signals that include data streams representing various types of signal information, e.g., instructions, messages and data. The functions of the data interface 272 may be performed by the communication interface 260.

In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. The processor(s) 252 may be used to perform various actions such as various actions, processes, or modules involving determining, analyzing, performing actions, etc.

The term "computer readable storage medium" or "computer usable storage medium" as used herein refers to any non-transitory medium that participates in providing instructions to the processor(s) 252 for execution. Such a medium may take many forms, including but not limited to, non-volatile media and volatile media. Non-volatile media includes, for example, optical or magnetic disks, such as the disk drive 258. Volatile media includes dynamic memory, such as the system memory 254.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

Figure 4:
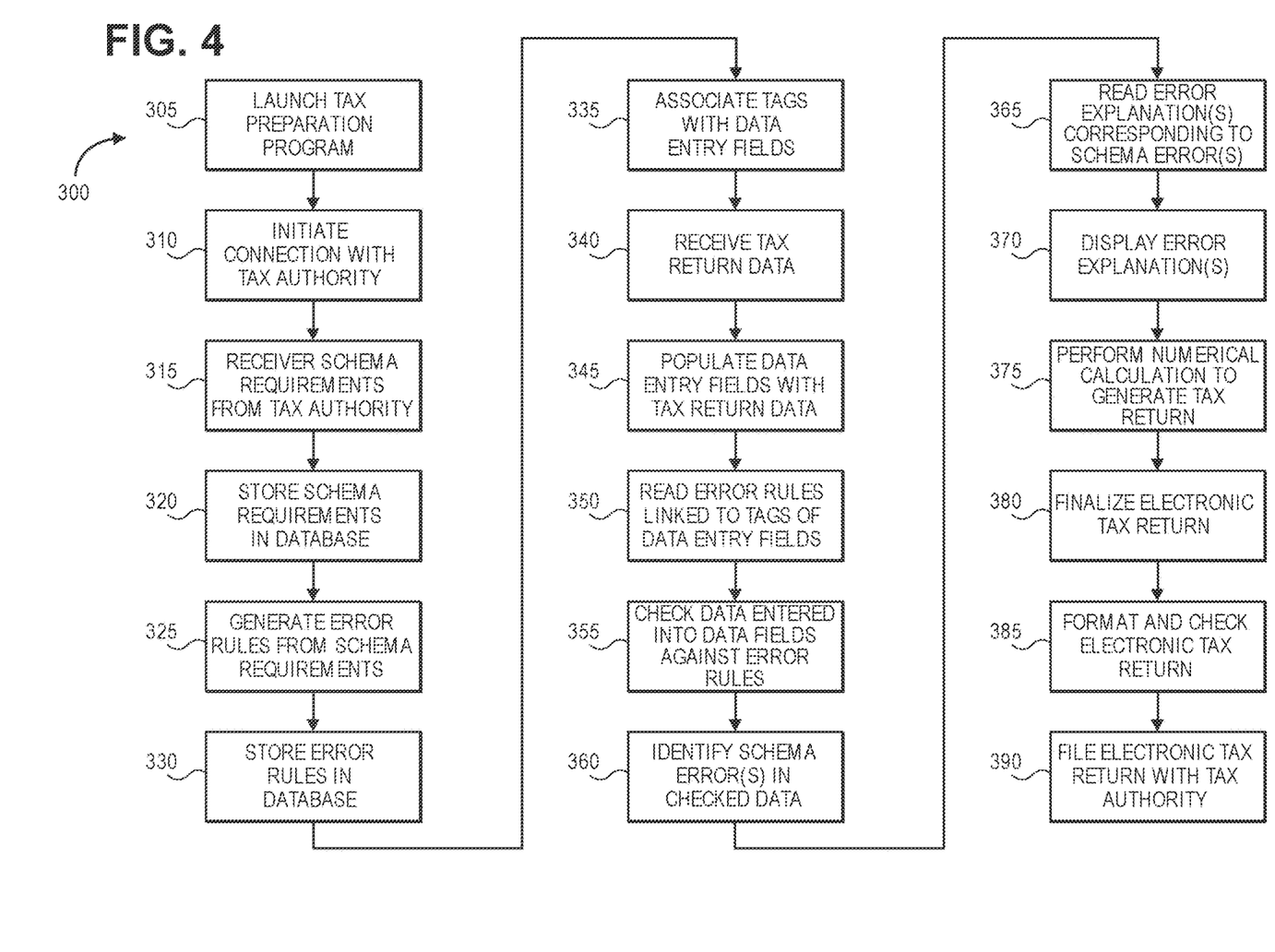
FIG. 4 is a flow diagram illustrating one process performed by the system of FIG. 1 to prepare and file the electronic tax return with the tax authority.

Having described the arrangement and function of the system 100, one method 300 for operating the system 100 to prepare and file an electronic tax return 115 with the tax authority 145 will now be described. First, the preparer 125 launches the tax preparation program 110 to begin preparation of the electronic tax return 115 (step 305). The tax preparation program 110 may be executed locally on the user computer 105 or may be executed on the intermediary computer 130, in which case, the executed tax preparation program 110 can be remotely accessed on-line by the user computer 105 over a connection between the user computer 105 and the intermediary computer 130 via the network 150a.

In response to executing the tax preparation program 110, a connection is initiated with the tax authority computer 140 (step 310). In the illustrated embodiment, a first connection is initiated between the tax authority computer 140 and the intermediary computer 130. In the illustrated embodiment where the tax preparation program 110 and database 160 reside within the user computer 105, a second connection will be initiated between the user computer 105 and the intermediary computer 140. Of course, if the intermediary computer 130 is not used, only connection between the user computer 105 and the tax authority computer 140 will be needed. In the alternative embodiment where the tax preparation program 110 and database 160 reside within the intermediary computer 130, the first connection established between the intermediary computer 130 and the tax authority computer 140 will suffice.

In any event, once the connection(s) are established, the most up-to-date schema requirements are received from the tax authority 145 via the connection(s) (step 315), and stored in the tax database 160 residing in the user computer 105 or alternatively in the intermediary computer 130 (step 320). Next, the schema error module 175 of the tax analysis program 155 generates a plurality of error rules from the schema requirements, with each error rule being associated with a respective data entry field of the electronic tax return 115 (step 325), and stored in the tax database 160 residing in the user computer 105 or alternatively in the intermediary computer 130 (step 330).

Next, the tax preparation program 110 associates tags with the respective data entry fields associated with the electronic tax return 115, such that each of the tags are linked to a respective one of the error rules (step 335). Next, various tax return data is received by the tax preparation program 110 at the user computer 105 (step 340), and the data entry fields associated with the electronic tax return 115 are populated with the received tax return data (step 345). The data entry fields associated with the electronic tax return 115 may, e.g., be populated using interview screens and/or forms containing fillable form fields. The data may be entered into the data entry fields, e.g., manually into the data entry fields by the preparer 125 of the electronic tax return 115, electronically scanned into the data entry fields, and/or imported from a database into the data entry fields.

Next, the error check engine 170 of the tax analysis program 155 reads from the tax database 160 the error rules linked to the respective tags of the data entry fields (step 350), checks the data entered into the respective data entry fields against the linked error rules (step 355), and identifies one or more schema errors in the data entered into the data entry fields (step 360). Steps 350, 355, and/or 360 can be performed as the data is entered into the data entry fields or performed only after all of the data has been entered into the data entry fields.

Then, the error check engine 170 reads the error explanations corresponding to the schema error(s) from the database 160 (step 365), and displays the error explanations on the display screen of the user computer 105 (step 370). Alternatively, the error explanation can be converted to a natural language expression, which can then be displayed to the preparer 125. Additionally, more detailed narrative explanations may be generated in response to user prompts. The preparer 125 can be alerted of the schema error(s) using other means, such as highlighting or identifying the data entry field(s) in which data having the schema error(s) was entered. The error messages may be displayed or the preparer 125 may otherwise be alerted to the schema error(s) before the electronic tax return 115 is completed, e.g., in real time during the preparation of the electronic tax return 115 in response to the input of the data having the schema error(s) into the data entry field(s). It should be understood that steps 360-370 may be performed sequentially, simultaneously and/or in different orders depending on, for example the sequence and content of interview screens and the manner in which data is imported or entered into the tax preparation program 110 (e.g., manually or imported from another program or file).

As the data is entered into the data entry fields, the tax preparation program 110 performs numerical calculations based on the entered data to generate the electronic tax return 115 (step 375). After the electronic tax return 115 is completed, data errors are corrected, a final review for missing data or missing deductions is completed, and an audit check is completed to finalize the electronic tax return 115 (step 380). The completed electronic tax return 115 is transmitted from the user computer 105 to the intermediary computer 130, which may be an electronic filing system or server that coordinates electronic filing of the completed tax return 115. The electronic tax return 115 is formatted and checked as necessary by the intermediary computer 220 (step 385), and electronically filed with the tax authority computer 140 (step 390).

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense. Further, where methods or processes described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. Accordingly, embodiments are intended to exemplify alternatives, modifications, and equivalents that may fall within the scope of the claims.

What is claimed is:

1. A method for identifying errors in a computerized preparation of an electronic extensible markup language (XML) document formatted according to one or more schema requirements, the method comprising:

receiving, by a processor, the schema requirements, the schema requirements including XML data entry requirements;

generating, by the processor, a plurality of data entry fields presented on a user interface, each data entry field comprising an associated XML data entry requirement;

receiving, by the processor, data entered into the plurality of data entry fields through the user interface;

generating, by the processor, a plurality of error rules from the schema requirements, each error rule being generated in view of a respective one of the plurality of data entry fields and the associated XML data entry requirement, and each error rule defining the associated XML data entry requirement for the respective one of the plurality of data entry fields;

checking, by the processor, the data entered into the data entry fields against the respective error rules to identify data entered into one or more of the data entry fields that does not comply with the respective XML data entry requirement for each of the one or more of the data entry fields;

identifying, by the processor, one or more schema errors for the one or more of the data entry fields in the data entered into the data entry fields as the data is entered into the data entry fields based on the checking;

receiving, by the processor, corrected data into the one or more of the data entry fields through the user interface; and generating, by the processor, the electronic document based on the data entered into the data entry fields and the corrected data.

2. The method of claim 1, further comprising:

associating, by the processor, a plurality of tags with the respective plurality of data entry fields, each of the tags being linked to a respective one of the error rules; and for each data entry field, reading, by the processor, the error rule linked to the tag of the respective each data entry field, and checking, by the processor, the data entered into the respective data entry field against the linked error rule to identify a schema error in the data entered into the respective data entry field.

3. The method of claim 1, wherein the data entered into the data entry fields is received by at least one of manual entry by a preparer of the electronic document into the data entry fields, electronic scanning into the data entry fields, and importation from a database into the data entry fields.

4. The method of claim 1, further comprising alerting a preparer of the electronic document of the one or more schema errors by displaying a message on a screen of a user computer utilized to prepare the electronic document.

5. The method of claim 1, further comprising alerting a preparer of the electronic document of the one or more schema errors by highlighting or identifying the data entry field in which data having a schema error was entered.

6. The method of claim 1, wherein one or more of the error rules is associated with one or more respective error explanations, the method further comprising, by the processor, generating a narrative explanation utilizing the one or more error explanations associated with the identified one or more schema errors.

7. The method of claim 6, wherein the one or more error explanations comprise templates having fillable fields, and the narrative explanation is generated using the templates and filling in the fillable fields using the data entered into the data entry fields.

8. The method of claim 6, wherein the one or more error explanations comprises fragments, expressions, and partial statements, and generating the narrative explanation comprises converting the one or more error explanations into natural language expressions.

9. The method of claim 6, further comprising generating, by the processor, additional, more detailed narrative explanations in response to user prompts.

10. A system configured to identify errors in a computerized preparation of an electronic extensible markup language (XML) document formatted according to one or more schema requirements, the system comprising:

a processor configured to:

receive the schema requirements, the schema requirements including XML data entry requirements;

generate a plurality of data entry fields presented on a user interface, each data entry field comprising an associated XML data entry requirement;

receive data entered into the plurality of data entry fields through the user interface;

generate a plurality of error rules from the schema requirements, each error rule being generated in view of a respective one of the plurality of data entry fields and the associated XML data entry requirement, and each error rule defining the associated XML data entry requirement for the respective one of the plurality of data entry fields;

check the data entered into the data entry fields against the respective error rules to identify data entered into one or more of the data entry fields that does not comply with the respective XML data entry requirement for each of the one or more of the data entry fields;

identify one or more schema errors for the one or more of the data entry fields in the data entered into the data entry fields as the data is entered into the data entry fields based on the checking;

receive corrected data into the one or more of the data entry fields through the user interface; and generate the electronic document based on the data entered into the data entry fields and the corrected data.

11. The system of claim 10, wherein the processor is further configured to:

associate a plurality of tags with the respective plurality of data entry fields, each of the tags being linked to a respective one of the error rules; and for each data entry field, read the error rule linked to the tag of the respective each data entry field, and check the data entered into the respective data entry field against the linked error rule to identify a schema error in the data entered into the respective data entry field.

12. The system of claim 10, wherein the data entered into the data entry fields is received by at least one of manual entry by a preparer of the electronic document into the data entry fields, electronic scanning into the data entry fields, and importation from a database into the data entry fields.

13. The system of claim 10, further comprising a display, wherein the processor is further configured to alert a preparer of the electronic document of the one or more schema errors by displaying a message on the display.

14. The system of claim 10, further comprising a display, wherein the processor is further configured to alert a preparer of the electronic document of the one or more schema errors by highlighting or identifying the data entry field in which data having a schema error was entered on the display.

15. The system of claim 10, wherein one or more of the error rules is associated with one or more respective error explanations, and the processor is further configured to generate a narrative explanation utilizing the one or more error explanations associated with the identified one or more schema errors.

16. The system of claim 15, wherein the one or more error explanations comprise templates having fillable fields, and the processor is configured to generate the narrative explanation using the templates and filling in the fillable fields using the data entered into the data entry fields.

17. The system of claim 15, wherein the one or more error explanations comprises fragments, expressions, and partial statements, and the processor is configured to generate the narrative explanation by converting the one or more error explanations into natural language expressions.

18. The system of claim 15, wherein the processor is configured to generate additional, more detailed narrative explanations in response to user prompts.

* * * * *